(12) United States Patent
Hanquez et al.

(10) Patent No.: US 10,615,662 B2
(45) Date of Patent: Apr. 7, 2020

(54) ROTARY ELECTRIC MACHINE COOLED BY A HEAT-TRANSFER FLUID

(71) Applicant: Valeo Equipements Electriques Moteur, Creteil (FR)

(72) Inventors: Michaël Hanquez, Creteil (FR); Hugues Gervais, Creteil (FR); Virginie Leroy, Creteil (FR); Michel Le Douarin, Creteil (FR)

(73) Assignee: Valeo Equipments Electriques Moteur, Creteil (FR)

(*) Notice: Subject to any disclaimer, the term of this patent is extended or adjusted under 35 U.S.C. 154(b) by 228 days.

(21) Appl. No.: 15/764,734

(22) PCT Filed: Sep. 26, 2016

(86) PCT No.: PCT/FR2016/052442
§ 371 (c)(1),
(2) Date: Mar. 29, 2018

(87) PCT Pub. No.: WO2017/055725
PCT Pub. Date: Apr. 6, 2017

(65) Prior Publication Data
US 2018/0278120 A1     Sep. 27, 2018

(30) Foreign Application Priority Data

Sep. 30, 2015 (FR) ...................... 15 59248

(51) Int. Cl.
*H02K 9/00* (2006.01)
*H02K 5/20* (2006.01)
(Continued)

(52) U.S. Cl.
CPC ............... *H02K 5/20* (2013.01); *B60K 6/26* (2013.01); *H02K 1/185* (2013.01); *H02K 7/006* (2013.01);
(Continued)

(58) Field of Classification Search
CPC ............ H02K 5/20; H02K 9/19; H02K 1/185; H02K 7/116; H02K 9/18; H02K 7/006; H02K 9/10; H02K 9/12
(Continued)

(56) References Cited

U.S. PATENT DOCUMENTS 5,220,225 A * 6/1993 Moon, Jr. ............... F04B 1/22
                                                  310/87
5,616,973 A * 4/1997 Khazanov ............... H02K 5/20
                                                  310/54

(Continued)

FOREIGN PATENT DOCUMENTS

DE      101 41 890 A1    3/2003
EP      0 831 580 A2     3/1998
(Continued)

OTHER PUBLICATIONS

International Search Report issued in PCT/FR2016/052442 dated Nov. 23, 2016 (3 pages).
(Continued)

*Primary Examiner* — Thanh Lam
(74) *Attorney, Agent, or Firm* — Osha Liang LLP

(57) ABSTRACT

The invention relates to a rotary electric machine which comprises: a stator provided with a body; a casing in at least two parts; an annular chamber for cooling the machine (30) delimited by an outer wall (23) that belongs to one of the parts of the casing (2, 3) and is made of a moldable material such as aluminium; and an inner wall (31) belonging to a steel part (31) which is thinner than the outer wall (23) and shaped so as to have a region (33) for mounting the stator body and two docking regions (22, 24) each having a seal (36) by virtue of their arrangement on either side of the mounting region (33) of the stator body.

14 Claims, 5 Drawing Sheets

(51) Int. Cl.
*B60K 6/26* (2007.10)
*H02K 1/18* (2006.01)
*H02K 7/00* (2006.01)
*H02K 7/116* (2006.01)
*H02K 9/19* (2006.01)

(52) U.S. Cl.
CPC ............... *H02K 7/116* (2013.01); *H02K 9/19* (2013.01); *B60Y 2200/92* (2013.01); *B60Y 2400/60* (2013.01); *Y10S 903/906* (2013.01)

(58) Field of Classification Search
USPC ................................................ 310/52–59, 89
See application file for complete search history.

(56) References Cited

U.S. PATENT DOCUMENTS

| | | | | |
|---|---|---|---|---|
| 7,394,175 | B2* | 7/2008 | McAuliffe | H02K 1/20 |
| | | | | 310/58 |
| 7,944,106 | B2* | 5/2011 | Miller | B60K 6/26 |
| | | | | 310/112 |
| 8,541,914 | B2* | 9/2013 | Knight | H02K 5/20 |
| | | | | 310/52 |
| 2013/0342045 | A1* | 12/2013 | Matsuki | H02K 5/20 |
| | | | | 310/54 |
| 2015/0048700 | A1* | 2/2015 | Liu | H02K 9/19 |
| | | | | 310/54 |
| 2015/0069862 | A1 | 3/2015 | Bulatow | |
| 2015/0207378 | A1 | 7/2015 | Buttner et al. | |
| 2015/0326094 | A1* | 11/2015 | Cunningham | E21B 41/0007 |
| | | | | 310/87 |

FOREIGN PATENT DOCUMENTS

| | | |
|---|---|---|
| EP | 0 881 742 A2 | 12/1998 |
| FR | 2 483 702 A1 | 12/1981 |
| FR | 2 745 444 A1 | 8/1997 |
| FR | 2 782 356 A1 | 2/2000 |
| FR | 2 793 083 A1 | 11/2000 |
| FR | 3 005 906 A1 | 11/2014 |
| WO | 02/093717 A1 | 11/2002 |
| WO | 2004/040738 A1 | 5/2004 |
| WO | 2006/129030 A1 | 12/2006 |
| WO | 2014/199516 A1 | 12/2014 |

OTHER PUBLICATIONS

Written Opinion of the International Searching Authority issued in PCT/FR2016/052442 dated Nov. 23, 2016 (7 pages).

* cited by examiner

ROTARY ELECTRIC MACHINE COOLED BY A HEAT-TRANSFER FLUID

FIELD OF THE INVENTION

The present invention relates to a rotary electric machine cooled by a heat-transfer fluid. The electric machine could be an electric motor, such as an electric motor belonging to a hybrid motor vehicle, an alternator that enables consumers to be fed and a battery to be re-charged or a reversible alternator—known as alterno-starter that at least enables a thermal engine to be re-started particularly after a stop of the motor vehicle at red traffic lights. The electric machine could belong to an electric vehicle.

STATE OF THE ART

As known a rotary electric machine comprises a mouldable material casing, such as an aluminium casing, an outer stator provided with a body, such as a body in the shape of a lamination stack, supporting a stator winding, an inner rotor rotating integrally with a rotor shaft mounted in the casing.

The casing comprises at least a front flange and a rear flange. This casing of hollow form serves to house the inner rotor, such as a rotor with permanent magnets, claws or projecting poles. This casing on its outer periphery supports the body of the outer stator mounted particularly by shrink-fit in the casing.

The casing is also configured centrally to support at least one bearing means, such as a roller bearing, for rotationally mounting the rotor shaft.

The stator winding could be of the polyphase type, particularly the three-phase type, crossing the stator body and projecting on either side of the stator body to form coil ends. This winding comprises at least one winding per phase. The ends of the windings could be star-connected as shown for example on FIG. 1 of document EP 0831 580 or delta-connected. These ends could be connected to a rectifying bridge, as described for example in document WO 02/093717 or to an inverter as described by way of example in documents EP 0831 580 and FR 2 745 444. These documents should be referred to for more precise details.

The machine heats up when operating. It is thus important to cool this efficiently, particularly the stator of the latter to increase its performance.

With this aim, conventionally, the machine is cooled by internal ventilation, the front and rear flanges being perforated for this purpose, while the rotor has at least one fan to make air circulate inside the casing. For example document WO 02/093717 mentioned above should be referred to for more precise details.

Attempt is always made to increase the power of the electric machine so that it is necessary to increase cooling of the latter.

With this intention it has already been proposed to cool the machine using heat-transfer fluid, such as the liquid cooling the thermal engine of the motor vehicle, the said fluid circulating in a cooling chamber arranged in the casing of the machine.

Such a solution is shown on FIG. 1, which is an axial cross-sectional view corresponding to the upper part of FIG. 13 of document FR 2782 356, to which reference should be made for more precise details.

FIG. 1 shows that cylindrical body 10 of outer stator 5 is mounted by shrink-fit on inner periphery 6000 of spacer 61 and that reaction plate 4' has a clearance on its outer periphery so as not to interfere with coil end 8 of stator winding 5. Reaction plate 4' also has a further clearance so as not to interfere with squirrel-cage 60 which comprises inner rotor 6. This cage 60 is supported by the body, which comprises inner rotor 6. The body of rotor 6 is crimped on outer periphery 47 of the extension of reaction plate 4' comprising a hollow for housing part of torsion damper 20' of the clutch, here a diaphragm clutch controlled by a belt fork 50. Friction 20' comprises a hub which rotates integrally with shaft 12 of the gear box of the vehicle. Axis X-X of shafts 11 and 12 constitutes the rotational axis of the machine. In this FIG. 1 the cylindrical bodies of stator 5 and rotor 6 are in the shape of a lamination stack, body 10 of stator 5 comprising teeth to support the stator winding. An air-gap exists between the inner periphery of body 10 of stator 5 and the outer periphery of the body of rotor 6.

Chamber 6002, also called water pocket, in one embodiment has a cylindrical shape. Pipes supported by spacer 61 are designed to feed chamber 6002 with the presence of a separator between the heat-transfer fluid inlet and outlet (see FIGS. 14 and 15 of document FR 2 782 356). A drain plug is also provided in the bottom of the spacer.

The chamber is produced by moulding with the presence of sand to form a core which is removed after moulding. With this intention the spacer is equipped with means to remove the sand as shown on FIG. 14 of document FR 2 782 356.

This arrangement is satisfactory.

Nevertheless it would be desirable to decrease the rate of rejection and thus reduce the cost.

During production of the chamber porosities or movements can occur due to the sand. These porosities or movements may lead to leaks after the stator body has been assembled in the spacer. Admittedly some spacer-stator assemblies can be recovered by injecting resin but this increases the cost.

Furthermore it could be desirable to decrease the thickness of the inner wall of the chamber, which is at least 4 mm thick and limits the outer diameter of the stator body to the detriment of the machine's performance.

In addition it is desirable in all cases to achieve reliable and durable sealing without needing to repeat the process.

OBJECT OF THE INVENTION

The present invention is aimed at responding to these wishes.

According to the invention a rotary electric machine comprising an outer stator equipped with a body supporting a stator winding, an annular chamber for cooling the machine delimited by an outer wall and an inner wall for receiving heat-transfer fluid and a casing comprising at least two parts housing an inner rotor is characterized in that:

the outer wall of the cooling chamber belongs to one of the parts of the casing made of mouldable material such as aluminium;

the inner wall of the chamber belongs to a steel part which is thinner than the outer wall;

the steel part is shaped so that it has a region for mounting the stator body and two docking regions each having a seal by virtue of their arrangement on either side of the mounting region of the stator body;

one of the docking regions, known as first docking region, has an outer diameter greater than that of the other docking region, known as second docking region;

the outer mouldable material wall is prolonged internally at an end by a first supporting piece intended to cooperate with the seal of the first docking region and at its other end by a step of inner diameter less than the inner diameter of the outer wall, the said wall forming a second supporting piece to cooperate with the seal of the second docking region.

By virtue of the invention, for the same inner diameter of the outer wall, the outer diameter of the stator body can be increased, the inner steel wall possibly being less than 4 mm in thickness, for example about 1 to 1.5 mm. The power of the machine can thus be increased.

The rejection rate and the cost are reduced because the construction of the inner wall in steel enables use of a moulding with a sand core for producing the chamber to be avoided. The constraints with regard to the outer wall which could be crude are decreased.

Furthermore steel conducts heat efficiently and the mounting region could have an outer diameter less than that of the docking regions so that the volume of the chamber can be adjustably determined in combination with the opposite outer wall.

In addition the sealing of the chamber is reliable since the axial steel part can be assembled by axially threading into the outer wall, the seal of the second docking region being made of less diameter since it is intended to cooperate ultimately with the second supporting piece, the second docking region having an outer diameter less than that of the inner diameter of the outer wall.

It will be appreciated, on the one hand, that the outer wall and both supporting pieces can be easily produced by axial demoulding and, on the other hand, the desired volume of the chamber can be produced by playing with the diameters of the mounting region and the docking regions.

The steel part could be produced by shaping a steel panel, such as a thin steel sheet equal to or less by definition than 3 mm in thickness according to standard NF EN 10130 of 2006. Thus a steel sheet of high formability, such as a cold-rolled steel sheet of type DC 04 according to standard NF EN 10130 could be used. A circle could be cut out in this sheet then, by deep drawing, the material of this sheet is stretched to form a tube, the ends of which are then deformed by increasing the diameter to form the docking regions. Serrated rollers could be used to form the docking regions and a machine with punch and die to stretch the metal.

Alternatively a thin steel tube the ends of which are deformed and finally shaped is used to form the docking regions for example with the aid of serrated rollers.

Alternatively the inner wall could be produced by stamping a steel plate followed by rolling and welding operations owing to the fact that the inner wall is steel.

The steel sheet could comprise a coating to resist corrosion. For example a steel sheet covered with a zinc layer of 10 microns, such as a steel sheet DC 04 ZE could be used. Alternatively a stainless steel sheet is used. In the same way the outer wall, for example made of aluminium, could be treated so that it resists corrosion.

According to one aspect of the invention, the chamber belongs to the front flange in the shape of a jar with a peripheral skirt closed by a lid generally of flat shape constituting the rear flange and in which the outer wall belongs to the skirt of the front flange internally tapered in diameter to form the inner periphery of the outer wall and the supporting pieces.

Other features taken separately or in combination are as follows:

- the heat-transfer fluid is the liquid cooling the thermal engine of the motor vehicle;
- the heat-transfer fluid is oil;
- the heat-transfer fluid is air;
- the casing is made of aluminium;
- the casing is made of cast iron;
- the casing comprises at least one other part made of steel;
- the casing comprises a front flange and a rear flange, the outer wall of the chamber belonging to one of the front or rear flanges;
- the outer wall of the chamber belongs to a spacer of the casing inserted between the front flange and the rear flange of the casing;
- the casing is sealed;
- the casing is closed;
- the axial ends of the casing comprise openings for air circulation inside the casing and mixed cooling of the machine;
- the supporting pieces have an axial length greater than that of their associated docking region;
- the docking regions each have a groove for receiving a seal;
- the seals of the docking regions are flat gaskets;
- the seals of the docking regions are O rings;
- one of the seals is a flat gasket and the other seal is an O ring;
- the seals are identical and have the same outer diameter, the seal associated with
- the seals have different outer diameters,
- the docking regions have the same axial length;
- the docking regions have different axial lengths;
- the mounting region comprises a rib projecting radially in the direction of the outer wall to separate the heat-transfer fluid inlet and outlet;
- the rib is of axial orientation;
- the rib is axially inclined;
- the mounting region is devoid of a projecting rib to separate the heat-transfer fluid inlet and outlet;
- the first docking region is prolonged outside at its loose end by a fastening edge of transverse orientation projecting towards the outside and intended to be fixed to a transverse shoulder delimiting the loose end of the first supporting piece of the part concerned of the casing;
- the shoulder belongs to an outer extra piece of material which includes the part concerned of the casing;
- the shoulder is continuous;
- the shoulder is fragmented;
- the fastening edge consists of a plurality of legs;
- the legs are perforated for fixing to the shoulder using fastening elements, such as screws threaded into tapped holes of the outer extra material;
- the mounting region of the steel part is a shrink-fit area of the stator body; the mounting region of the steel part is a welding area of the stator body;
- the mounting region of the stator body is an area for receiving a conductive thermo-setting resin injected radially between the stator body and the mounting region;
- the rotary electric machine is an electric motor;
- the rotary electric machine is a high-performance machine intended to equip a hybrid vehicle which fulfils several functions or an electric vehicle;
- the rotary electric machine is an alternator;
- the rotary electric machine is an alterno-starter;
- the rotor of the machine is a permanent magnet rotor;
- the rotor of the machine is a claw rotor;

the rotor of the machine is a rotor with projecting poles;
the stator of the machine comprises a stator winding with concentric coils;
the stator comprises a stator winding of the wavy type;
the stator body is segmented.

Particularly the axial ends of the casing are closed to form a sealed casing.

Advantageously the axial ends of the casing are provided with openings for mixed cooling of the machine.

Particularly the casing comprises a spacer interposed between a front flange and a rear flange and in which the chamber belongs to the spacer.

The steel part can be produced by forming a thin steel sheet of high deformability, such as a steel sheet DC 04.

The steel sheet, such as a steel sheet DC 04 ZE, is particularly covered with a thin anti corrosion coating.

Possibly the heat-transfer fluid is the liquid cooling a thermal engine of a motor vehicle. Particularly the mounting region of the steel part is a shrink-fit area of the stator body.

Other advantages will appear on reading the description below in a non-restrictive way with reference to the appended drawings

SHORT DESCRIPTION OF THE DRAWINGS

Identical or similar elements in the figures have the same reference symbols.

DESCRIPTIONS OF EXEMPLARY EMBODIMENTS OF THE INVENTION

First Embodiment

Figure 1:
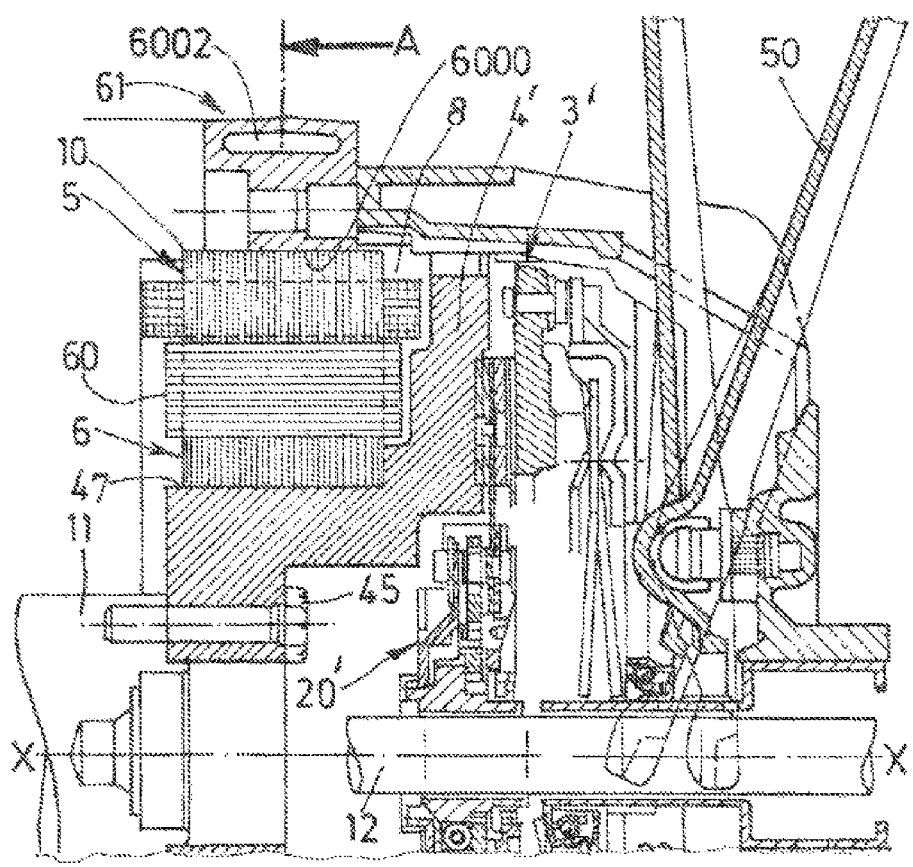
FIG. 1 is a partial axial cross-sectional view of a prior art rotary electric machine.

In this embodiment of FIGS. 1 to 7, rotary electric machine 1 comprises a casing 2, 3 made of a mouldable material, here an aluminium casing, an outer stator 5 equipped with body 10 in the shape of a lamination stack, having a preferably polyphase stator winding, an inner rotor 6 rotating integrally with a rotor shaft 4 mounted in casing 2, 3. Rotor 6 also comprises a body in the shape of a lamination stack not referenced on FIG. 2. Axis X-X (FIG. 2) of shaft 4 constitutes the rotational axis of machine 1. In the continuation of the description the radial, axial and transverse orientations refer to this axis. In the same way by considering FIG. 2 front to rear orientation corresponds to top to bottom orientation. Rotor 6 and stator 5 are mounted in a coaxial way relative to axis X-X, an air-gap existing between the inner periphery of body 10 of stator 5 and the outer periphery of the body of rotor 6. The bodies of rotor 6 and stator 5 are generally annular in shape.

Casing 2, 3 (FIG. 2) in this embodiment comprises a front flange 2 and a rear flange 3 also called front bearing and rear bearing. These flanges 2, 3 are made of mouldable material, here aluminium. They are produced by moulding. Casing 2, 3 of hollow form acts as housing for inner rotor 6 here in the shape of a permanent magnet rotor (not referenced on FIG. 2) supported by the body of rotor 6. The body of rotor 6 could be fixed on shaft 4, in a known way, by forcefully crimping shaft 4 in the inner bore of the body of rotor 6. This rotor could comprise permanent magnets, such as magnets made of ferrite or rare earth arranged in the form of a V, in a superficial or radial way as in FIGS. 6 to 8 of document FR 3 005 906 to which reference should be made. The winding of stator 5 could comprise concentric coils mounted electrically insulated on the teeth that comprises the stator body as described in this document FR 3 005 906 (see particularly FIG. 4). As described in this document the stator body could be continuous or fragmented. This type of polyphase winding—at least the three-phase type—comprises a connector of the phases and a neutral, the ends of which are star-connected, as shown for example on FIG. 1 of document EP 0831 580. These ends could be connected to an inverter as described for example in documents EP 0831 580 and FR 2 745 444 to which reference should be made. The coils mounted insulated electrically on the teeth of body 10 project axially on either side of this body to form coil ends 8. Alternatively the stator winding could be of the wavy type, with continuous conductive wires or with conducting segments as described for example in documents FR 2 483 702 and EP 0881 742 to which reference should be made or of the overlapping type i.e. with shortened wraps. In all cases these windings have electric conductors, for example made of copper and/or aluminium, covered with an electrical insulation layer. The resistance of the stator winding increases with temperature so that it is necessary to cool the stator in order not to reduce the performance of machine 1.

Figure 2:
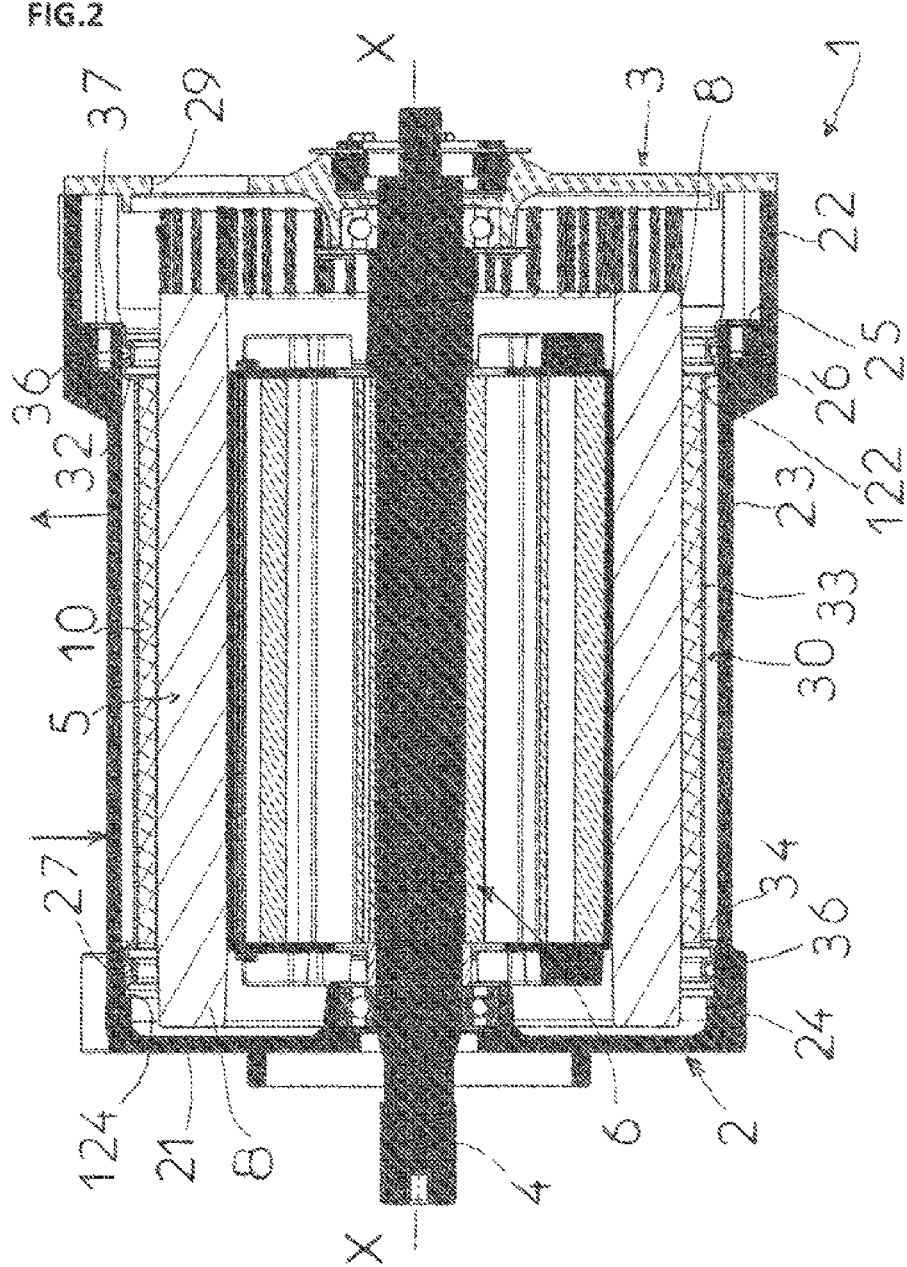
FIG. 2 is an axial cross-sectional view of a rotary electric machine according to the invention equipped with a cooling chamber having an outer wall and inner wall in the shape of a steel part.
Figure 3:
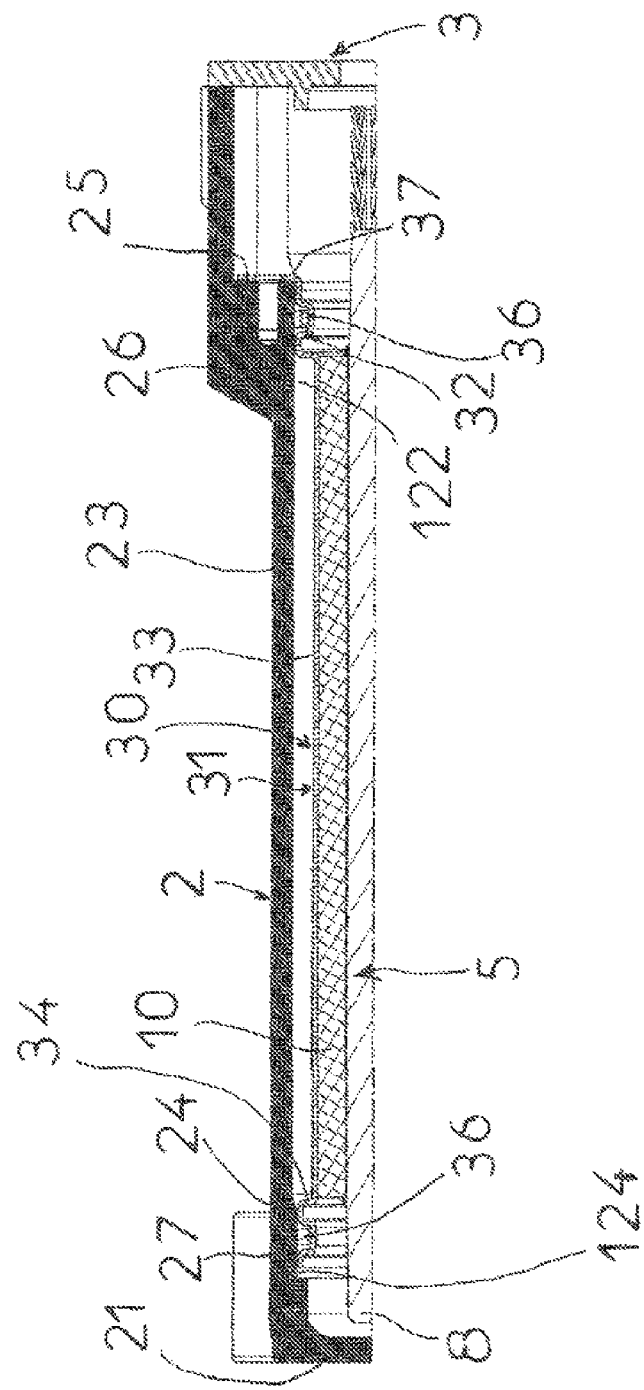
FIG. 3 is a partial view on a larger scale of the straight part of the machine in FIG. 2.

Casing 2, 3 also comprises legs, the root areas of which anchored in the outer periphery of part 2 of casing 2, 3 are shown on FIGS. 2 and 3. The legs serve to attach casing 2, 3 and the machine to a fixed part of a motor vehicle. These legs hold the machine axially and angularly. They prevent any rotation of stator 5 in flange 2. Such legs are shown for example in document WO 02/093717 mentioned above to which reference should be made. Alternatively the two parts of casing 2, 3 can be provided with legs. In yet another alternative at least one of the legs is replaced by a mounting plate.

The outer periphery of casing 2, 3 could comprise a mounting plate for an electronic box containing the inverter and its control electronics. Alternatively this box could be remote, as in document FR 2 745 444, with the presence of electrical connections for each cable between machine 1 and this electronic box.

The casing is also configured centrally to support at least one bearing, such as a roller bearing, mounted integrally with the rotor shaft.

More precisely casing 2, 3 comprises a front flange 2 generally in the shape of a jar closed by the rear flange 3 forming a lid of transverse orientation and generally of flat shape. Flange 2 (FIG. 2) has a bottom 21 generally of transverse orientation prolonged on its outer periphery by an annular skirt 22, 23, 24 of axial orientation which on the outside could support the electronic box of the inverter. The loose end of skirt 22, 23, 24 is in contact with the outer periphery of rear flange 3. Flange 3 could be attached to skirt 22, 23, 24 via fastening elements, such as screws crossing by virtue of holes in the outer periphery of flange 3, which are threaded in tapped holes arranged in the loose end of skirt 22, 23, 24. This loose end of flange 2 could be thicker in some places for this purpose. This flange 3 could also be fastened using ears projecting from holes tapped in the rear loose end of flange 2 as in document FR 2 782 356 or by virtue of an outer flange with tapped holes at the rear loose end of flange 2.

As shown on FIG. 2, flanges 2, 3 are centrally perforated to allow the shaft of rotor 4 to pass through and each has a sleeve (not referenced) directed towards the inside of the casing for assembling the outer ring of a roller bearing (not referenced on FIG. 2). The inner ring of the roller bearing could be crimped into the corresponding end of shaft 4. The outer ring of each bearing could rest against the transverse edge of the flange concerned delimiting the central opening of the latter with the body of the gearbox. The front end of shaft 4 is grooved for rotatable connection to a gearbox (not shown), bottom 21 for this purpose having a centring ring (not referenced). The rear end of shaft 4 is associated, in a known way, with a resolver to follow the rotation of the rotor and send information to the aforementioned electronic box containing the electronics and inverter to control machine 1. Machine 1 in this embodiment is a high-performance machine associated with the thermal engine of a hybrid vehicle to also power the driving wheels of the hybrid vehicle. This machine fulfils several functions especially to re-start the thermal engine following a stop of the latter at red traffic lights, a function of regenerative braking to re-charge a battery as the vehicle brakes, a function of manoeuvring the vehicle during parking of the latter, a function of preventing the thermal engine from stalling, a function of assisting the thermal engine particularly when the hybrid vehicle is accelerating. Naturally, as in the starters of motor vehicles, a disengaging device is designed to disconnect electric machine 1 for example when the speed of the hybrid vehicle exceeds 130 km per hour.

The machine heats up when operating. It is thus important to cool the latter efficiently, particularly the stator of the latter so as to increase its performances and not to damage it. Thus the electric machine of the aforementioned type comprises an annular chamber 30 to cool the machine, delimited by an outer wall 23 and an inner wall 33 to receive heat-transfer fluid, its casing comprising at least two parts 2, 3 housing an inner rotor 6. Chamber 30 is also called water pocket.

Outer wall 23 of cooling chamber 30 belongs to one of parts 2 of casing 2, 3 made of a mouldable material, such as aluminium. In this embodiment it is annular and axial in orientation.

Inner wall 33 of chamber 30 belongs to a steel part 31 which is thinner than outer wall 23;

Steel part 31 is shaped so as to have a region 33 for mounting body 10 of stator 5 and two docking regions 32, 34 each having a seal 36 by virtue of their arrangement on either side of the mounting region 33 of the stator body;

One of docking regions 32, known as first docking region, has an outer diameter greater than that of the other docking region 34 known as second docking region.

Outer wall 23 made of mouldable material is prolonged internally at one end by a first supporting piece 122 intended to cooperate with seal 36 of first docking region 32 and at its other end by a step 27 of inner diameter less than the inner diameter of outer wall 23, the aforementioned wall with its inner periphery forming a second supporting piece 124 to cooperate with seal 36 of second docking region 34. As clear from the above, step 27 constitutes an inner protuberance.

The heat-transfer fluid could be the liquid cooling the thermal engine of the hybrid motor vehicle. This heat-transfer fluid could also be used to cool the aforementioned electronic box containing the inverter, particularly if this box is supported by casing 2, 3.

By virtue of these arrangements, for the same diameter of the outer wall, steel part 31 enables the outer diameter of generally cylindrical body 10 of stator 5 to be increased since the steel part is thinner than outer wall 23. This increase in diameter allows the performance of the electric machine to be enhanced. This part 31 is a good conductor of heat and constitutes a heat sink, which via its mounting region 33 evacuates the heat released by body 10 of stator 5 in the direction of cooling chamber 30. Steel part 31 could be produced by shaping a steel sheet, such as a thin steel sheet equal to or less than 3 mm in thickness. Preferably this panel is a metal sheet of high deformability allowing the latter to be stretched in the same way as when manufacturing cooking pots.

Thus a steel sheet of high formability, such as a cold-rolled steel sheet of type DC 04 according to standard NF EN 10130 could be used. This sheet could be formed by cutting out a circle in this sheet, then by deep drawing the material of this sheet could be stretched to form a tube, the ends of which are then deformed by increasing the diameter to form the docking regions. Serrated rollers could be used to form the docking regions and a machine with punch and die to stretch the metal. Steel part 31 could thus have a thickness of 1 to 1.5 mm, while the thickness of the outer wall 23 could be at least 4 mm. This arrangement allows the weight to be reduced.

Outer wall 23 could be advantageously crude taking into account the difference in diameter between the docking regions enabling seals 36 to be arranged in a way described hereafter. This arrangement reduces the manufacturing cost and increases the reliability of chamber 30, any leaks around wall 23 being minimized by virtue of the fact that wall 23 is not machined.

Preferably the steel sheet could comprise a coating to resist corrosion. For example a steel sheet covered with a zinc layer of 10 microns, such as a steel sheet DC 04 ZE, could be used. Alternatively a stainless steel sheet is used. In the same way the outer wall, for example made from aluminium, could be treated, so that it resists corrosion. Alternatively part 31 could be a stainless steel sheet.

The outer diameter of mounting region 33 could be equal to that of second docking region 34. For this purpose consequently the thickness could be increased and inner diameter of step 27 decreased.

Advantageously, in order to increase the volume of cylindrical chamber 30, the outer diameter of assembly wall 33 of body 10 of stator 5 could have an outer diameter less than that of docking regions 32, 34. By virtue of this arrangement annular chamber 30 of axial orientation could have the desired volume, realising that axially and radially this volume is delimited by outer wall 23 and inner mounting region 33 facing each other. The embodiment of steel part 31 by shaping a steel sheet enables the radial height of the chamber to be easily varied, by playing with the outer diameter of mounting region 33. Furthermore this arrangement allows the thickness (radial height) of step 27 to be decreased and thus the weight of flange 2 of casing 2, 3 to be reduced.

It will be noted that each supporting piece 122, 124 has an axial length greater than that of its opposite docking region 22, 24 and that front bearing 2 can be easily produced by moulding. Indeed axial demoulding of flange 2 is easy since step 27 of second region 124 has an inner diameter less than that of the inner diameter of outer wall 23. Compared to the solution of FIG. 1 the constraints with respect to outer wall 23 are reduced.

The sealing of chamber 30 is reliable because steel part 31 inside flange 2 is assembled by axially threading part 31 from front to rear, seal 36 of second docking region 34 being made because it finally comes into contact with second region 124 without being degraded by outer wall 23. Indeed when this seal 36 is axially threaded it could not be in contact with wall 23 or in sliding contact with outer wall 23 without specific tightening. It is only at the end of threading from front to rear that seals 36 are inserted and compressed, rear flange 3 being subsequently attached.

Seals 36 are produced in this way.

Docking regions 32, 34 could have the same axial length.

Figure 4:
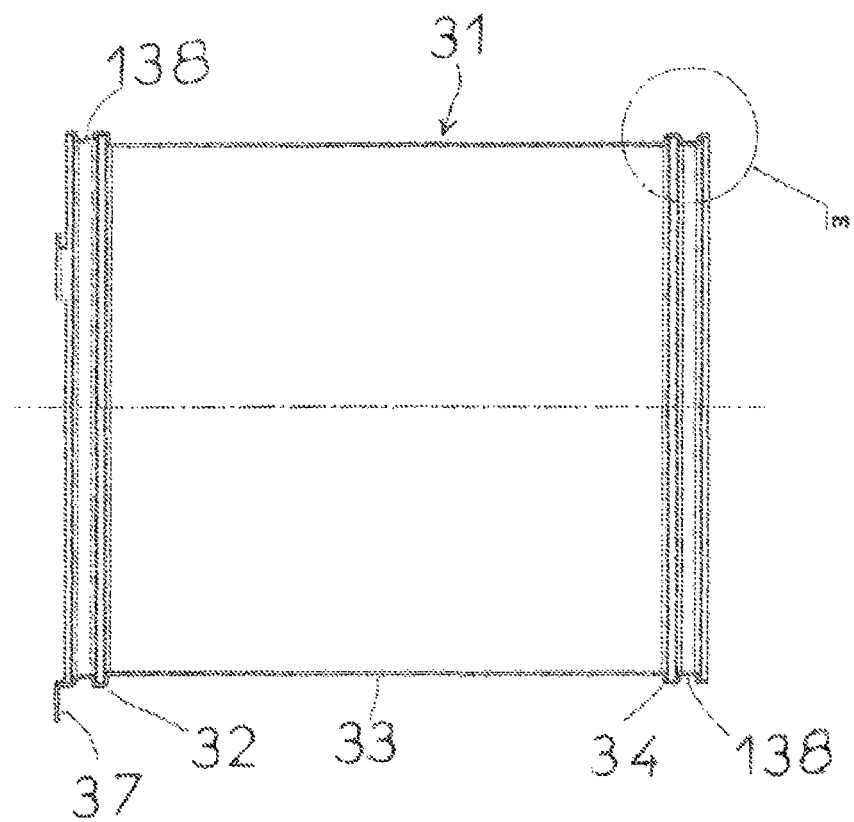
FIG. 4 is a top view on a scale which is different from the steel part in FIGS. 2 and 3.
Figure 5:
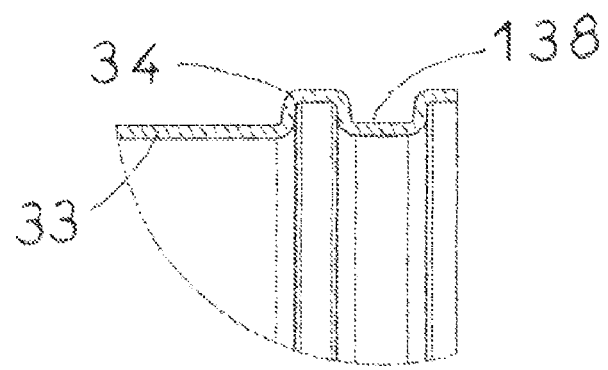
FIG. 5 is a detailed view corresponding to insert E of FIG. 4 on a large scale showing the groove to receive the seal of a docking region.
Figure 6:
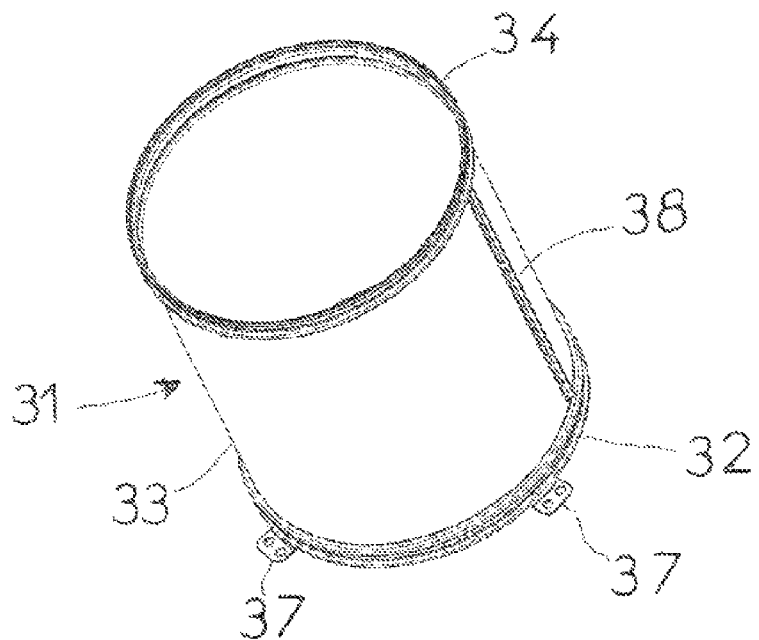
FIG. 6 is a perspective view for the steel part in FIGS. 2 and 4 showing the rib to separate the inlet and outlet of heat-transfer fluid.

As shown in FIG. 4 each docking region 32, 34 comprises a groove 138 for receiving seal 36 shown more clearly on FIG. 5. These grooves 138 project radially towards the inside and are produced for example using serrated rollers as the remainder of areas 32, 34 having larger diameter than that of the base of groove 138. Grooves 138 here generally affect the docking regions centrally and make docking regions 32, 34 rigid.

These grooves 138 have generally parallel sides and an annular flat bottom. Preferably the sides are slightly inclined for clearing the serrated roller to form groove 138.

The difference in radius between first region 32 and second region 34 could be 1 mm to 1.5 mm. The difference in radius between second docking region 34 and mounting region 33 could be at least 3 mm, while the difference in radius between first docking region 32 and mounting region 33 could be at least 4 or 4.5 mm. The inner diameter of the mounting region could be at least 290 mm, while the axial length of region 33 could be equal to at least 89 mm and the axial distance between grooves 138 could be equal to at least 109 mm. Naturally this depends on the application, realising that in this example machine 1 has high performance. Seals 36 could preferably be O rings as shown in FIGS. 2 and 3.

Because of the small difference in radius between both docking regions 32, 34 seals 36 can be identical, seal 36 of first region 32 being stretched more than the other.

In this embodiment, as shown in FIGS. 2 and 3, skirt 22, 23, 24 of front flange 2 has several portions, i.e. a rear cylindrical portion 22 in contact at its rear loose end with rear flange 3, an intermediate cylindrical portion 23 and a front portion 24. The end of front portion 24 is connected to bottom 21 transverse in orientation of front flange 2. It is this front portion 24 which comprises step 27 projecting radially towards the inside with its inner periphery to form second region 124. The end of this wall is chamfered, here rounded, in order not to damage seal 36 of docking region 34.

The outer diameter of rear portion 22 is greater than the outer diameter of intermediate cylindrical portion 23. This intermediate portion 23 constitutes the outer wall of cooling chamber 30, here cylindrical in form.

Front flange 2 is internally tapered in diameter. Thus the inner diameter of rear portion 22 is greater than the inner diameter of outer wall 23, while the inner diameter of step 27 is less than the inner diameter of wall 23.

Thus these shapes can be produced by axial demoulding.

Outer wall 23 made of mouldable material is prolonged internally at one end, its rear end in this example, by a first supporting piece 122 intended to cooperate with seal 36 of first docking region 32 and at its other end, the front end in this example, by a step 27 of inner diameter less than the inner diameter of outer wall 23, the aforementioned wall forming a second region 124 to cooperate with seal 36 of second docking region 34. First supporting piece 122 thus constitutes a prolongation of the inner periphery of outer wall 23.

First docking region 32 (FIGS. 2 and 3) is prolonged outside at its loose end by a fastening edge 37 transverse in orientation projecting towards the outside and intended to be attached to a transverse shoulder 25 delimiting the inner end of first portion 22 of flange 2. This shoulder 25 also delimits the loose end of first supporting piece 122 and projects towards the outside.

Shoulder 25 belongs to an outer protuberance in the shape of an outer extra piece of material 26 which includes the part concerned of the casing, here front flange 2. This extra piece prolongs rear portion 22 and is connected on its outer periphery to outer portion 23 by a chamfer (FIGS. 2 and 3). This extra piece of material 26, inserted between portions 22, 23, on its inner periphery internally has an axial length greater than that of first docking region 32.

Shoulder 25 and edge 37 could be continuous.

Figure 7:
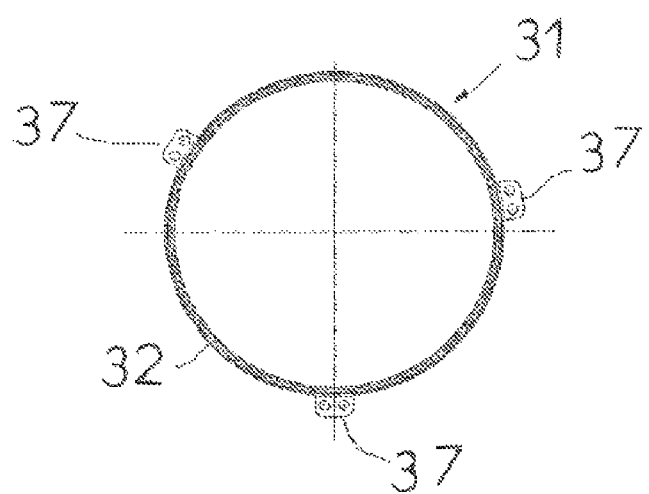
FIG. 7 is a front view of FIG. 6 showing the mounting legs projecting towards the outside of the loose end of the steel part.

Fastening edge 37 could consist of a plurality of legs 37. The number of legs 37 here is equal to 3 (FIG. 7). These legs 37 are circumferentially distributed in a regular manner. Naturally the number of legs 37 depends on the application and thus can be greater than three or equal to two.

Legs 37 are perforated for fixing to shoulder 25 using fastening elements, such as screws threaded into holes (not referenced) tapped in outer extra piece of material 26, the axial length of which depends on the depth of the tapped holes.

Each leg 37 has at least one hole for the passage of the fastening element the head of which comes into tight contact with the outer face of leg 37. The number of holes depends on the radial height of shoulder 25. Here two holes are provided for each leg (FIG. 7). If the radial height of the shoulder is increased just one hole may be enough, the head of the fastening screw possibly being sufficiently large.

Ranges 122, 124 belong to extra pieces of material 26, 27 having different inner diameters, one—extra piece 26—projecting towards the outside and the other—extra piece 27—projecting towards the inside.

Alternatively, to decrease the weight in an advantageous way, extra piece of material 26, shoulder 25 and portion 22 could be discontinuous and belong to embossings. Naturally supporting piece 122 is continuous. More precisely the circumferential width of shoulder 25, extra piece of material 26 and portion 22 could be the same as the assembly clearance near to the circumferential length of legs 37. The inner periphery of portion 22 could constitute a centring device for the outer periphery of legs 37 with rounded ends. By virtue of this arrangement flange 2 with steel part 31 forms a robust unit, easy to handle and transportable. The displacement of part 31 in flange 2 is also restricted by co-operation of legs 37 with shoulder 25. Good positioning of seals 36 is thus achieved. Docking regions 32, 34 allow part 31 to be easily threaded into the inner periphery of flange 2 subsequently closed by flange 3.

In this example cylindrical body 10 of the stator is mounted by shrink-fit in the mounting region 33, part 31 for example being heated for this purpose then cooled for tight contact with the outer periphery of cylindrical body 10 of stator 6, which could be continuous or segmented. Steel part 31 thus enables heat to be evacuated efficiently. Body 10 of the stator could be assembled in mounting region 33 after or before part 31 is threaded in flange 2.

Naturally flange 2 at wall 23 supports heat-transfer fluid inlet and evacuation (outlet) pipes. These pipes can be produced by moulding with the flange or turned back as described in document FR 2 782 756 (see FIG. 15). The pipes can have elbows. The position of these pipes, also called conduits, depends on the application. On FIG. 2 these pipes are shown by arrows in a schematized way.

The pipes could be produced by moulding with front flange 2 or be connected to flange 2 as in document FR 2 782 356 mentioned above (see FIG. 15). Naturally a drain plug could be inserted in the bottom of flange 2 as shown on FIG. 14 of document FR 2 782 356.

In the aforementioned way heat-transfer fluid could flow through the electronic box, particularly for cooling the inverter, before entering chamber 30 via the inlet pipe. Alternatively, particularly if the electronic box is remote, heat-transfer fluid, here the liquid cooling the thermal engine, is only used to cool chamber 30.

Mounting region 33 of part 31 could be provided advantageously with a rib 38 (FIG. 6) projecting in the direction of the outer wall to form a separator between the heat-transfer fluid inlet and outlet in cylindrical chamber 30. In this FIG. 6 rib 38 is axial in orientation. Alternatively it is axially inclined. All depends on the application and the position of the pipes. The inlet and outlet pipes could be arranged on either side of rib 38. They could be shifted axially as shown in a schematized way on FIG. 2. Alternatively the mounting region 33 is devoid of a rib. Part 31 thus in a simple and economic way enables many functions to be obtained. It allows flange 2 to be simplified.

Second Embodiment

Alternatively in order to produce steel part 31, a thin steel tube, the ends of which are deformed and finally shaped, is used to form the docking regions for example by means of serrated rollers.

Third Embodiment

Alternatively steel part 31 could be produced by stamping a flat steel sheet followed by an operation of rolling and welding the steel sheet preferably in a thickness of less than or equal to 3 mm.

Other Embodiments

The heat-transfer fluid could be oil or gas.

Docking regions 32, 34 could have different axial lengths.

The difference in radius between the docking regions could be greater than 1.5 mm so that O rings 36 could be of different size.

Naturally, in a less advantageous embodiment, seals 36 could be flat gaskets. One of seals 36, for example the seal of the first docking region, could be flat and the other annular.

Extra piece of material 26 could be prolonged on its outer periphery so that outer wall 23 could be thicker.

Alternatively rear flange 3, generally flat in shape, could be machined so that the casing in all cases comprises at least one part 2, that delimiting chamber 30 being produced by moulding. The other part could be made of non-mouldable material. It could be made from steel.

Alternatively the structures could be reversed so that flange 3 becomes the front flange crossed by the shaft of rotor 4 and flange 2 the rear flange.

Rear flange 3 could be hollow and on its outer periphery have an annular skirt axial in orientation delimiting shoulder 25. This skirt of flange 3 could replace rear portion 22 of front flange 2. Alternatively rear portion 22 could be shorter and flange 2 could be less long axially. In all cases the skirt of the flange is attached to skirt 20, in the known way, for example using ties. This skirt of flange 3 provides space for the heads of the screws threaded into edge 37.

The loose end of the skirt of the rear flange internally could have an extra thickness to constitute a pressing plate which axially immobilizes legs 37 of part 31 in contact with shoulder 25.

In all cases this shoulder 25 could be provided with hollows to receive legs 37 in order to create a mortise-lock type connection preventing part 31 from rotating, the hollows having a depth less than or generally equal to the thickness of legs 37.

Casing 2, 3 could be sealed, the flange and bottom 21 of flange 2 being closed so that cooling is only provided by virtue of chamber 30.

Thus water, mud, dust or other pollutants cannot penetrate the inside of the casing. Flange 3 and bottom 21 of flange 2 could have openings, one being shown as 29 on FIG. 2, so that the machine could be cooled by means of heat-transfer fluid and air circulation inside the machine.

Body 10 of the stator could be welded to mounting region 33 owing to the fact that part 31 is made of steel, which is a weldable material.

Body 10 of the stator could be attached to mounting region 33 via a thin layer of conductive thermos-setting resin forming a heat sink.

In the aforementioned way body 10 of the stator could be continuous or fragmented.

The casing could comprise three parts as in documents FR 2 782 356 and FR 3 005 906 so that chamber 30 could be created in an axially inserted gap so that it can be fitted between a front flange and a rear flange.

A thin steel sheet in a thickness less than or equal to 3 mm, thicker or thinner than steel sheet DC 04 ZE, such as DC 03 ZE or DC 05 ZE sheets, could be used. A stainless steel sheet or a thin hot rolled steel sheet could also be used to produce part 31.

The casing could be made of cast iron.

Naturally a temperature gauge could be provided to measure the temperature of coil ends 8 and stop the machine if the stator winding overheats.

Applications

The rotary electric machine with cylindrical chamber 30 could be interposed between the thermal engine and the gear box of the motor vehicle as described in the aforementioned documents FR 2 782 356 and FR 3 005 906. This machine could be inserted between two clutches.

The rotor of the machine could have permanent magnets, projecting poles or claws. Permanent magnets could be associated with the claws or the projecting poles.

The electric machine could be more powerful and belong to an electric vehicle. It could constitute the electric motor of the electric vehicle.

The machine could be less powerful. Thus the machine could constitute an alternator, such as described in document WO 02/093717 mentioned above with a rectifying bridge to change AC into DC and a claw rotor or an alterno-starter with rear flange supporting the electronics of the machine via a mezzanine as described in documents
WO 2006/129030 and WO2004/040738. In this case the rotor shaft could cross the front bearing being integral with a pulley connected by a transmission with at least one belt to a pulley of the crankshaft of the thermal engine. In these configurations it is the rear flange of the machine which benefits from the outer wall of the cooling chamber, being devoid of an air outlet. In this type of embodiment it is possible to keep the air intake openings and to replace the fans with axially-acting fans, the air thus passing through the casing horizontally. Naturally it is possible to remove the fans, claw rotor or projecting poles allowing the air to circulate horizontally.

Naturally the electronics of the machine could be supported alternatively by the skirt of the rear flange.

The machine could be an electric motor with an inverter of the type described in documents EP 0831 580 and FR 2 745 444 mentioned above.

The electric machine could be an alternator belonging to a range extender of an electric vehicle. In this case the rotor shaft could be connected by means of a rib connection to an auxiliary thermal engine to re-charge the batteries of the motor vehicle.

In all cases machine 1 could be fitted very near to the thermal engine.

The invention claimed is:

1. A rotary electric machine comprising:
   an outer stator provided with a body bearing a stator winding;
   an annular chamber for cooling the machine delimited by an outer wall and an inner wall for receiving heat-transfer fluid; and
   a casing comprising at least two parts housing an inner rotor wherein:
   the outer wall of the cooling chamber belongs to one of the parts of the casing made of a mouldable material,
   the inner wall of the chamber belongs to a part made of steel, which is thinner than the outer wall,
   the part is shaped so as to have a region for mounting the body of the stator and two docking regions each having a seal by virtue of their arrangement on either side of the mounting region of the stator body;
   one of the docking regions, known as first docking region, has an outer diameter greater than that of the other docking region, known as second docking region,
   the outer wall made of the mouldable material, is prolonged internally at one end by a first supporting piece configured to cooperate with the seal of the first docking region and at its other end by a step having a diameter less than the inner diameter of the outer wall, and
   the outer wall forms a second supporting piece to cooperate with the seal of the second docking region.

2. The machine according to claim 1, wherein the outer diameter of the mounting region is less than the outer diameter of the docking regions.

3. The machine according to claim 1, wherein the axial length of each supporting piece is greater than the axial length of its opposite docking region.

4. The machine according to claim 1, wherein each docking region has a groove to receive a seal.

5. The machine according to claim 1, wherein the mounting region has a rib projecting in the direction of the outer wall to form a separator between the heat-transfer fluid inlet and outlet.

6. The machine according to claim 1, wherein the first docking region is prolonged outside at its loose end by a fastening edge transverse in orientation projecting towards the outside and intended to be attached to a transverse shoulder delimiting the loose end of the first supporting piece of the part concerned of the casing.

7. The machine according to claim 6, wherein the transverse shoulder belongs to an outer extra piece of material that includes the part concerned of the casing.

8. The machine according to claim 7, wherein the outer extra piece of material has tapped holes for fixing the fastening edge using fastening elements comprising screws.

9. The machine according to claim 8, wherein the fastening edge consists of a plurality of legs perforated for attaching to the shoulder using the fastening elements.

10. The machine according to claim 7, wherein the extra piece of material is inserted between the outer wall and an end area being connected on its inner periphery to the transverse shoulder.

11. The machine according to claim 1 wherein the seals are O rings.

12. The machine according to claim 1, wherein the casing comprises a front flange and a rear flange and in which the outer wall of the chamber belongs to one of the flanges.

13. The machine according to claim 12, wherein the chamber belongs to the front flange in the shape of a jar with a peripheral skirt closed by a generally flat lid constituting the rear flange and in which the outer wall belongs to the skirt of the front flange internally tapered in diameter to form the inner periphery of the outer wall and the supporting pieces.

14. The machine according to claim 13, wherein the rotor is integral with a shaft crossing the front flange having a grooved end for connection to a gearbox intended to power the driving wheels of a thermal engine hybrid vehicle.

* * * * *